July 11, 1933.  C. B. SMITH  1,918,141

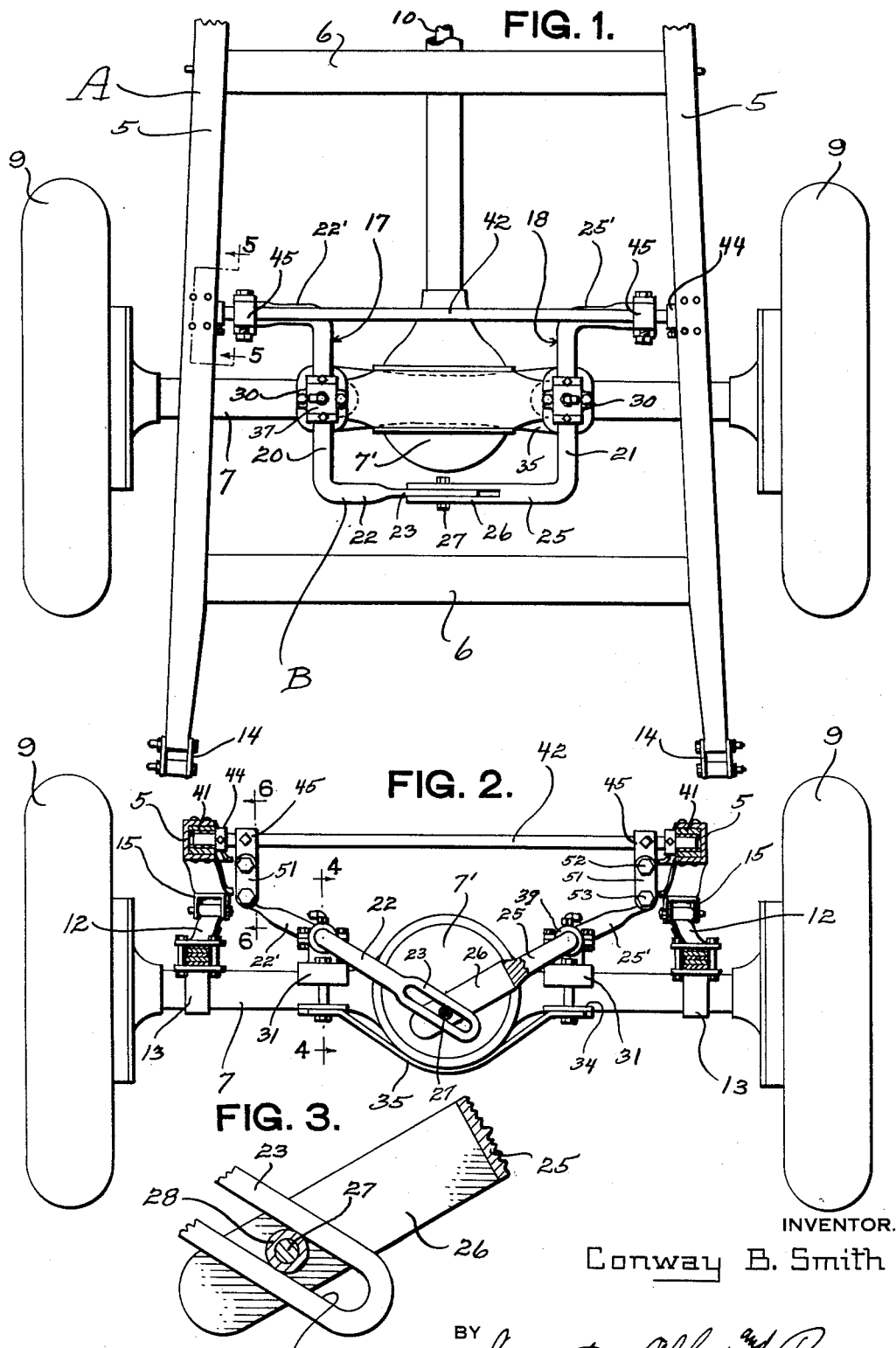

EQUALIZER FOR VEHICLE SPRINGS

Filed July 3, 1931   2 Sheets-Sheet 2

INVENTOR.
Conway B. Smith

BY Lancaster, Allwine and Rommel.
ATTORNEYS.

Patented July 11, 1933

1,918,141

UNITED STATES PATENT OFFICE

CONWAY B. SMITH, OF PORTSMOUTH, VIRGINIA

EQUALIZER FOR VEHICLE SPRINGS

Application filed July 3, 1931. Serial No. 548,654.

The present invention relates to spring equalizing means primarily intended for use upon motor vehicles and embodying improved features of construction over my copending application, Serial Number 536,603, filed May 11, 1931.

The primary object of the invention resides in the provision of a device adapted to be associated with a motor vehicle for evenly distributing the load upon the vehicle springs regardless of uneven distribution of weight on the vehicle body.

A further object of the present invention is to provide an improved spring equalizing means which may be readily applied to existing forms of vehicle constructions in a manner to permit proper functioning of the equalizer without requiring alterations to the vehicle for accommodating the equalizer.

A further object of the invention is to provide an equalizer for vehicle springs embodying adjustable features permitting attachment of the equalizer to vehicle frames of varying widths.

A further object of the invention is to provide a spring equalizer adapted to be associated with the frame and the axle housing of a motor vehicle in such manner as to permit proper functioning of the vehicle springs and allowing for the slight relative movement between the frame and the axle housing.

Other objects and advantages of the invention will be apparent during the course of the following detailed description, taken in connection with the accompanying drawings forming a part of this specification and in which drawings:—

Figure 1 is a fragmentary top plan view of the rear end portion of a motor vehicle chassis and showing the improved equalizer applied.

Figure 2 is a fragmentary transverse section thru the chassis just rearwardly of the rear axle housing showing the equalizer applied.

Figure 3 is an enlarged fragmentary sectional view showing the pin and slot coupling arrangement for the inner ends of the equalizing lever arms.

Figure 4:
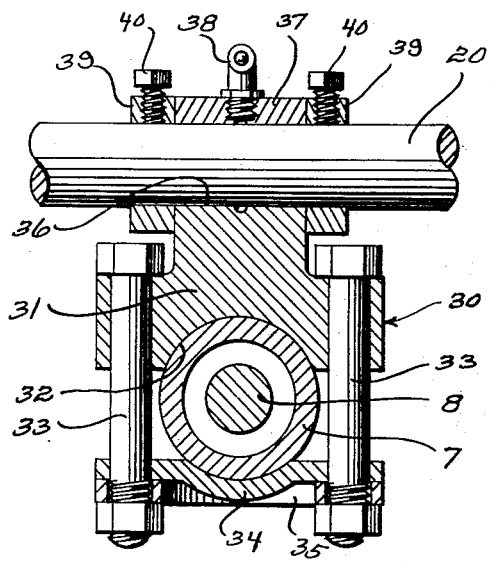
Figure 4 is an enlarged transverse section on the line 4—4 of Figure 2 showing the manner of pivotally connecting the lever arms to the axle housing.

In the drawings, and wherein similar reference characters designate corresponding parts throughout the several views, the preferred form of invention is disclosed in Figures 1 to 6 inclusive. The letter A designates a vehicle chassis of conventional construction and B the improved equalizer for attachment to the chassis A.

The chassis A includes the usual main frame embodying a pair of channel side rails 5 connected by the usual transverse or cross rails 6. The numeral 7 designates the rear axle housing enclosing the axle 8 having mounted upon its ends the driving wheels 9. Formed midway the ends of the axle housing 7 is the usual enlargement providing a differential housing 7' in which the differential gearing is arranged for imparting rotation to the wheels 9 from the drive shaft 10. Arranged to extend longitudinally beneath the side rails 5 are the usual semi-elliptic springs 12 which are connected intermediate their ends to the axle housing 7 by suitable clips 13. The rear ends of the springs 12 are connected to the rear ends of the side rails 5 by the usual spring hangers 14 and at their forward ends to the side rails by the usual brackets or spring hangers 15.

When an unevenly distributed load is placed upon the vehicle body a greater strain is placed upon one of the springs 12 causing the spring to yield to a greater extent than the opposite spring. This uneven yielding of the springs causes the vehicle body to careen or list so that in the case of a passenger vehicle, the riding qualities of the vehicle are greatly impaired aside from placing undue strain upon one of the springs. By providing the vehicle chassis with the improved equalizer B, the weight upon both of the springs 12 will be equalized even tho the load be unevenly distributed upon the body, and the frame will be caused to move up and down in parallel relation to the axle housing 7.

The equalizer B is intended to be connected between the main frame of the vehicle and the axle housing 7 with no connection whatever to the springs 12 and operating entirely independent of the springs. The device B embodies a pair of lever arms in the form of Z cranks 17 and 18 adapted to extend transversely of the vehicle frame and acting to transmit corresponding movement to the rails 5 upon yielding of the springs 12.

These Z cranks 17 and 18 are of substantially like construction and are respectively provided with intermediate shaft portions 20 and 21 for pivotal mounting upon the axle housing 7 one at each side of the differential housing 7'. These shaft portions 20 and 21 are mounted to rotate about an axis at a right angle to the axis of the axle housing 7 and parallel to the longitudinal axis of the vehicle frame. The rear end of the shaft portion 20 is formed with a crank arm 22 having its inner end flat and formed with a slot 24. The rear end of the shaft 21 is formed with a crank arm 25 having its inner end forked to provide spaced arms 26 for receiving therebetween the flat end 23 of the crank arm 22. These crank arms 22 and 25 are connected by a coupling bolt 27 carried by the arms 26 and extended thru the slot 24 whereby the crank arms are connected by a pin and slot connection. The coupling bolt 27 may be provided with a suitable roller 28 for working in the slot 24.

The Z cranks 20 and 21 are pivotally supported in mounting brackets 30 which are secured to the axle housing 7 at points spaced equidistant to each side of the differential housing 7'. These mounting brackets or supports 30 are formed with a bearing block 31 provided at its under side with a rounded seat 32 for resting upon the axle housing 7. The bearing blocks 31 are secured in position upon the axle housing by means of bolts 33 extended thru the block and thru straps 34 engaging the under side of the axle housing. The bearing block mounting bolts 33 also serve as a securing means for a tie plate or member 35 which arches downwardly below the differential housing 7'. This tie member 35 forms a spacer for retaining the bearing blocks in proper spaced apart relation. The upper side of each bearing block 31 is provided with a semi-circular shaped seat 36 for receiving the shafts 20 and 21 and suitable bearing caps 37 serve to retain the shafts in the seats 36. The bearing caps 37 may be provided with grease applicator fittings 38 and stop collars 39 provided with set screws 40 are disposed about each of the shafts 20 and 21 at opposite ends of the bearing caps for preventing longitudinal movement of the shafts. These stop collars 39 will also permit longitudinal adjustment of the shafts 20 and 21 during mounting of the equalizer.

Figure 5:
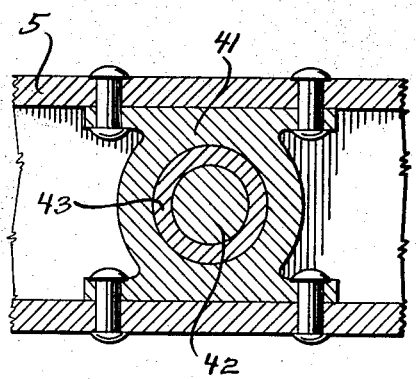
Figure 5 is an enlarged fragmentary section on the line 5—5 of Figure 1.

Mounted in the channel of each frame side rail 5 is a metal bearing block 41 and in which is journaled the end of a preferably cylindrical rock shaft 42 which extends parallel to the axle housing 7 and at a right angle to the longitudinal axis of the vehicle. These bearing blocks 41 are preferably riveted to the flanges of the side rails as shown in Figure 5 so that the side rails are not weakened to any extent. The blocks 41 may be provided with bearing sleeves 43 for receiving the ends of the shaft 42. Suitable stop collars 44 are provided on the shaft 42 and engage the blocks 41 for preventing longitudinal shifting of the shaft. As will be noted in Figure 1, the shaft 42 is mounted transversely of the frame at a location slightly forward of the axle housing 7.

Adjustable along the shaft 42 is a pair of hanger blocks 45 each being provided with a set screw 46 for securing the blocks in adjusted positions along the shaft.

The cranks 17 and 18 are respectively provided at the forward ends of their shaft portions with crank arms 22' and 25' which extend in an opposite direction to that of their respective crank arms 22 and 25. The outer ends of the crank arms 22' and 25' are flat and rolled into an eye 50 having its axis extending parallel to the axis of the shafts 20 and 21. The outer ends of the crank arms 22' and 25' are connected to their respective hanger blocks 45 by means of straps 51 having apertured upper and lower ends for respectively receiving upper and lower hanger bolts 52 and 53 respectively. The upper hanger bolts 52 are extended thru the lower end of the hanger blocks 45 while the lower hanger bolts 53 extend thru the eyes 50 provided at the ends of the crank arms 22' and 25'. The upper hanger bolts 52 extend thru the hanger blocks at a right angle to the shaft 42 and allow swinging movement of the links 51 upon rotation of the shaft portions 20 and 21 in their mounting brackets 30.

In operation, when a load is placed unevenly upon the frame A tending to exert a greater pressure upon one of the springs 12, the cranks 17 and 18 will, thru their pin and slot connection, cause both of the side rails 5 to be lowered an even degree and thus prevent tilting of the vehicle body due to uneven distribution of the load. The manner of connecting the outer ends of the crank arms 22' and 25' to the cross bar 42 permits ready swinging of the Z cranks thru up and down movement of the frame A, and the rotatable mounting of the shaft 42 in the side rails permits for slight forward and rearward relative movement of the rear axle housing 7 and the vehicle frame A permitted by the spring shackles connecting the springs 12 to the frame.

Thus it will be seen that the equalizer may be applied to a vehicle chassis without requiring any alteration thereto. By constructing the lever arms 17 and 18 in the form of Z cranks not only permits of a good bearing being provided for the cranks but also disposes the inner slidably connected ends of the cranks rearwardly of the differential housing so that the inner ends of the cranks may have a considerable degree of upward swinging movement without contacting with the vehicle body. As shown in Figure 2, when the normal weight of the vehicle body is upon the springs 12, the Z cranks are in a position with their crank arms in an upward and outwardly diverging position. The shaft 42 permits attaching the equalizer to vehicle frames of different widths thru cutting the rods to the proper length.

Figure 7:
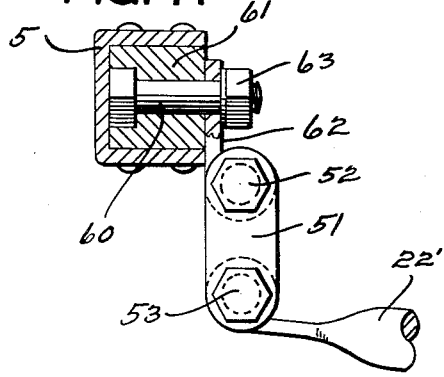
Figure 7 is a fragmentary sectional view showing a modified form of hanger means for the outer ends of the lever arms.

Referring to Figure 7, the slightly modified form of connecting the outer ends of the Z cranks to the side rails 5 has been shown. In this arrangement, the rod 42 is dispensed with and a bolt 60 is mounted in each bearing block 61. A hanger strap or member 62 is rotatable upon the projecting end of the bolt 60 and this hanger strap may have an eye formed at its lower end for receiving the upper hanger bolt 52. A nut 63 may be provided for retaining the strap 62 on the bolt 60.

Figure 8:
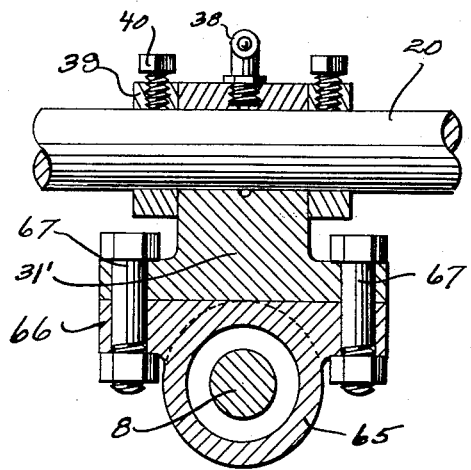
Figure 8 is a detail sectional view thru a modified form of pivotally mounting the levers upon the axle housing.
Figure 6:
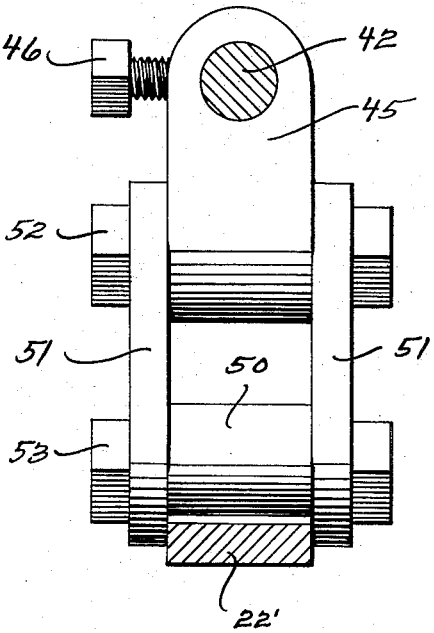
Figure 6 is an enlarged fragmentary section on the line 6—6 of Figure 2 and showing the hanger mounting for the outer ends of the levers.

Referring to Figure 8, in this showing, the axle housing 65 is provided with an integrally cast seat block 66 to which the bearing block 31' is secured as by suitable bolts 67. One of these seat blocks 66 will be cast upon the axle housing at each side of the differential housing.

Referring again to Figure 1 it will be noted that the shafts 20 and 21 are of such length as to permit for longitudinal adjustment thereof and this adjustment compensates for the inaccuracies in mounting of the bearing blocks 41 longitudinally of the frame A. The Z bar formation of the lever arms 17 and 18 also allows for the pivotal axes of the lever arms to be disposed closely above the axle housing so that the crank arms 22 and 25 may have considerable upward swinging movement without contacting with the car body.

While the equalizing device has been shown and described as being primarily adapted for use in connection with motor vehicles for equalizing pressure upon the rear springs and preventing listing or tilting of the vehicle body, it is to be understood that the device may be associated with various other forms of spring supported bodies such as seats, platforms, or any other structure having spaced yieldable supports.

Changes in the shape, size and arrangement of parts may be made to the forms of invention herein shown and described, without departing from the spirit of the invention or the scope of the following claims.

I claim:

1. In an equalizer, in combination with a frame, a supporting member extending transversely below the frame and spaced apart springs supporting the frame upon the supporting member; bearing blocks mounted in spaced relation on the supporting member, a lever arm having a central portion, an inner end portion inclined upwardly and an outer end portion inclined downwardly, said central portion pivotally mounted intermediate its ends in each bearing block, the end portions of each lever being inclined in the same plane and parallel to each other, means connecting the inner end portions of the lever arms for corresponding vertical swinging movement, and means adjustably and pivotally connecting the outer end portions of the lever arms to the frame to permit vertical and lateral movement of the frame relative to the supporting member.

2. In an equalizer, in combination with a rigid frame, a supporting member, and spaced apart springs supporting the frame upon the supporting member; a pair of lever arms pivotally mounted intermediate their ends upon the supporting member and having their inner ends connected for corresponding swinging movement, a cross member journaled on the frame and rotatable on an axis at a right angle to the pivotal axes of the lever arms, and means pivotally and adjustably connecting the outer ends of the lever arms to the cross member.

3. In an equalizer, in combination with a rigid frame, a supporting member, and spaced apart springs supporting the frame upon the supporting member; a pair of lever arms pivotally mounted intermediate their ends upon the supporting member and having their inner ends connected for corresponding swinging movement, a cross member journaled on the frame and rotatable on an axis at a right angle to the pivotal axes of the lever arms, a pair of hanger members adjustable along the cross member, and means connecting the outer ends of the lever arms to the hanger members to permit arcuate swinging movement of the lever arms at their outer ends.

4. In an equalizer for vehicle springs, in combination with a vehicle frame, an axle housing, and springs supporting the frame upon the axle housing; a pair of bearing blocks mounted in spaced relation upon the axle housing, a lever arm pivotally mounted intermediate its ends in each bearing block, means connecting the inner ends of the arms for corresponding vertical swinging movement, a shaft journaled in the frame in parallel relation to the axle housing, a pair of hangers adjustable along the shaft, and bolt and link means connecting the outer ends of the lever arms to the hangers.

5. In an equalizer for vehicle springs, in combination with a vehicle frame, an axle housing, and springs supporting the frame upon the axle housing; a pair of bearing blocks mounted in spaced relation upon the axle housing, a Z crank journaled at its shaft portion in each bearing block on axes at a right angle to the axle housing, coupling means connecting the inner crank arms of the Z cranks for corresponding vertical swinging movement, a rod journaled in the frame in parallel relation to the axle housing, a pair of hanger blocks adjustable along the rod, and spring shackle couplings connecting the hanger blocks to the outer crank arms of the Z cranks.

6. In an equalizer for vehicle springs, in combination with a vehicle frame, an axle housing, and springs supporting the frame upon the axle housing; a pair of bearing blocks mounted in spaced relation upon the axle housing, a Z crank journaled at its shaft portion in each bearing block on axes at a right angle to the axle housing and each embodying inner and outer crank arms, means permitting longitudinal adjustment of the shaft portions in their bearing blocks, coupling means for the inner crank arms connecting the arms for corresponding swinging movement, a shaft journaled in the frame forwardly of the axle housing, a pair of hanger blocks adjustable on the shaft, a coupling bolt carried by the lower portion of each hanger block in right angular relation to the shaft, a pair of links pivoted at their upper ends upon the coupling bolts, an eye formed at the outer end of each outer crank arm and arranged between the links, and a coupling bolt extended thru the eyes and connected to the links.

7. In an equalizer for vehicle springs, in combination with a vehicle frame, an axle housing provided midway its ends with a differential housing, and a spring supporting the frame upon the axle housing at each side of the differential housing; a bearing secured to the axle housing at each side of the differential housing, a tie member connecting the bearings, a Z crank journaled at its shaft portion in each bearing and each embodying an inner and an outer crank arm respectively arranged rearwardly and forwardly of the axle housing, means connecting the inner crank arms for corresponding vertical swinging movement, a rod journaled in the frame in parallel relation to the axle housing, a pair of hanger blocks adjustable along the rod, and spring shackle couplings connecting the hanger blocks to the outer crank arms of the Z cranks.

8. In a vehicle spring equalizer, in combination with a vehicle frame embodying channel side rails, an axle housing, and springs supporting the frame above the axle housing; a pair of bearings mounted on the axle housing, a lever arm pivotally mounted intermediate its ends in each bearing, means connecting the inner ends of the arms for corresponding swinging movement, a bearing block mounted between the flanges of each side rail and having axially aligning openings, a shaft journaled at its ends in the openings in the bearing blocks, means retaining the shaft against longitudinal movement, a pair of hanger blocks adjustable along the shaft, and means pivotally connecting the outer ends of the lever arms to the hanger blocks to permit arcuate swinging movement of the lever arms at their outer ends.

9. In an equalizer for vehicle springs, the combination with a frame embodying side rails, an axle housing, and springs supporting the side rails upon the axle, of a pair of lever arms, each having a horizontal central portion, an inner end portion inclined upwardly and an outer end portion inclined downwardly, said central portions pivotally mounted intermediate their ends upon the axle housing, said inner end portions connected together for corresponding swinging movement. The end portions of each lever being inclined in the same plane and parallel to each other, a bearing block mounted in each side rail, a bolt fixed in each block and having a portion projecting from the block, said bolts extending parallel to the axle housing, a strap rotatably supported upon the projecting portion of each bolt, and a spring shackle coupling connecting the outer end portions of the lever arms to the straps.

10. In a vehicle spring equalizer, in combination, a frame, an axle housing, a pair of seat blocks formed integral with the axle housing and spaced equidistant to each side of the center thereof, a spring supporting the frame upon the axle housing outwardly of each seat block, a bearing block secured to each seat block, a lever arm pivotally mounted intermediate its ends in each bearing block, means connecting the inner ends of the arms for corresponding vertical swinging movement, a shaft journaled in the frame in parallel relation to the axle housing, a pair of hangers adjustable along the shaft, and bolt and link means connecting the outer ends of the lever arms to the hangers.

CONWAY B. SMITH.